United States Patent [19]
Janzen et al.

[11] Patent Number: 5,772,503
[45] Date of Patent: Jun. 30, 1998

[54] CROP FEEDING APPARATUS FOR ROTATING CONCAVE THRESHING MECHANISM

[75] Inventors: Dave C. Janzen, Metamora; Ronald L. Satzler, Princeville; Edward E. Schmillen, Metamora, all of Ill.

[73] Assignee: Caterpillar Inc., Peoria, Ill.

[21] Appl. No.: 706,757

[22] Filed: Sep. 3, 1996

[51] Int. Cl.[6] .................................................. A01F 12/10
[52] U.S. Cl. ................................ 460/70; 460/8; 460/16; 460/119
[58] Field of Search ................................. 460/70, 8, 68, 460/69, 81, 119, 150, 201, 9, 10, 16

[56] References Cited

U.S. PATENT DOCUMENTS

| | | |
|---|---|---|
| 8,480 | 10/1851 | Roberts et al. . |
| 2,435,703 | 2/1948 | Wessman ................................ 146/81 |
| 3,586,004 | 6/1971 | DePauw ................................ 130/27 T |
| 3,771,298 | 11/1973 | Schmitt ................................. 56/14.6 |
| 3,794,046 | 2/1974 | Muijs ................................... 130/27 T |
| 3,853,131 | 12/1974 | Stokland ................................ 130/27 |
| 4,003,384 | 1/1977 | Komancheck et al. .................. 460/84 |
| 4,087,953 | 5/1978 | Wilson et al. ............................ 56/14.6 |
| 4,209,024 | 6/1980 | Powell et al. ......................... 130/27 T |
| 4,478,226 | 10/1984 | Tophinke ................................. 460/69 |
| 4,606,356 | 8/1986 | Odahara ................................ 130/27 R |
| 4,610,127 | 9/1986 | Eguchi et al. ............................ 56/14.6 |
| 4,875,890 | 10/1989 | Margerum et al. ...................... 460/68 |
| 4,998,904 | 3/1991 | Kersting ................................... 460/70 |
| 5,497,605 | 3/1996 | Underwood et al. ..................... 56/14.6 |

*Primary Examiner*—Terry Lee Melius
*Attorney, Agent, or Firm*—Larry G. Cain

[57] ABSTRACT

A grain combine has a header, a header discharge port, a feederhouse for transporting the cut crops from the header housing into a rotating concave threshing system. The header, discharge port and feederhouse are separated into separate first and second discrete cut crop passageways extending from the header to the intake end of the concave.

6 Claims, 4 Drawing Sheets

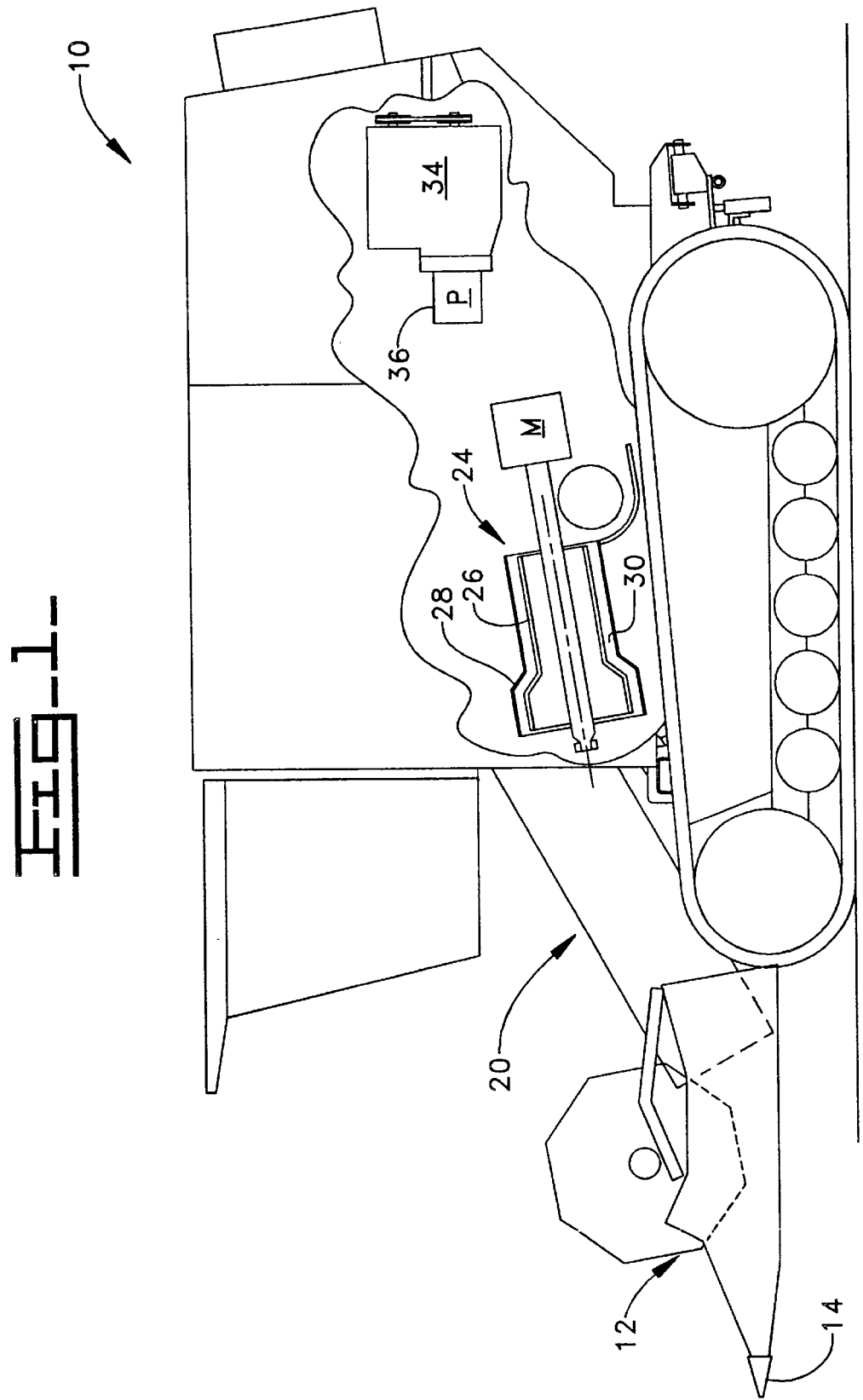

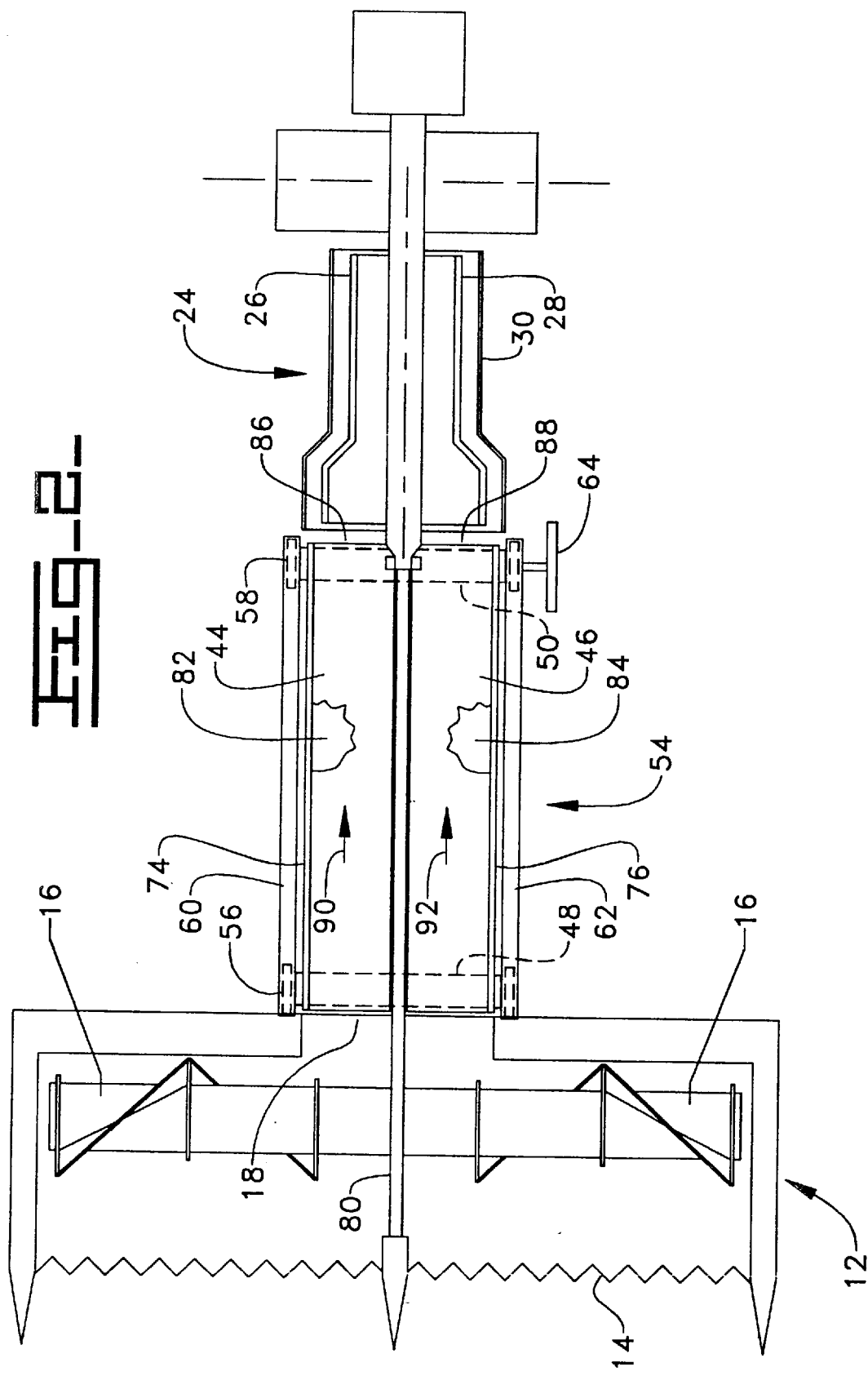

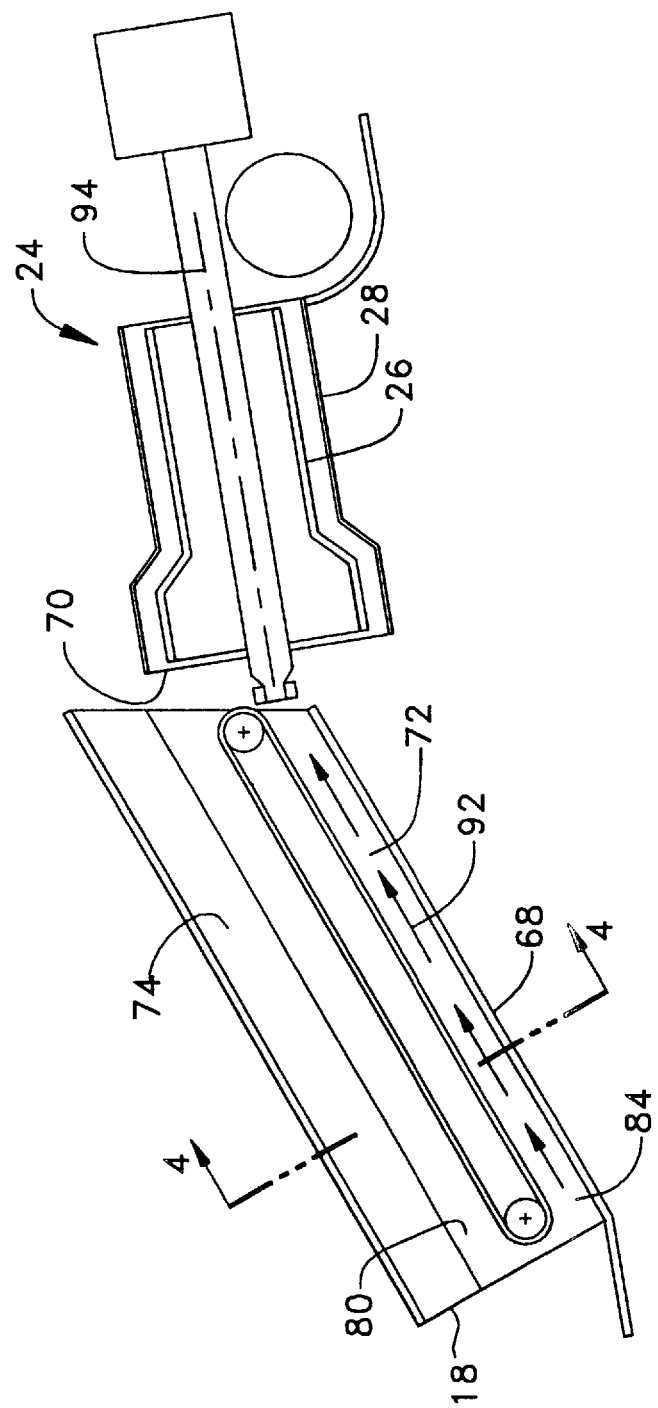

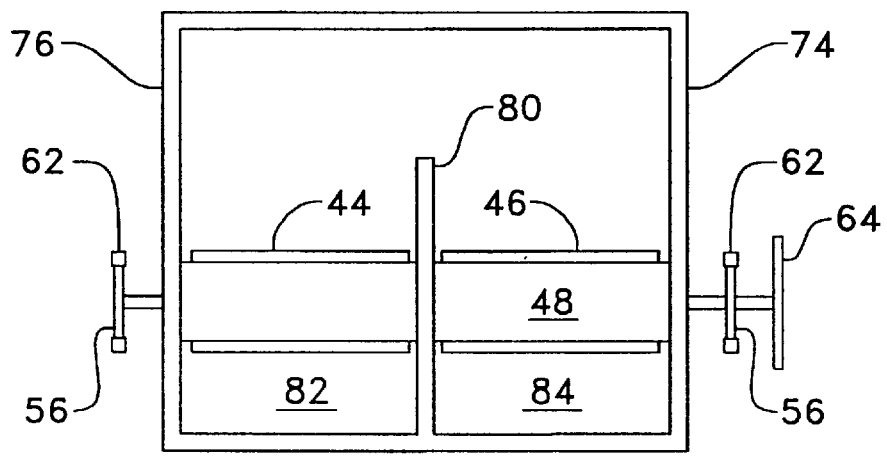
Fig_4_

CROP FEEDING APPARATUS FOR ROTATING CONCAVE THRESHING MECHANISM

DESCRIPTION

1. Technical Field

The present invention relates to apparatus for feeding cut crops into the threshing mechanism of a combine which has a rotating concave.

2. Background Art

A grain harvesting combine has a header which includes a sickle for severing crop from a field, and an auger or conveyor which directs the crop inward to a discharge port in a rearward portion of the header housing. The cut crop is then fed upwardly through a feederhouse to a threshing assembly which includes a rotating concave for threshing grain from the cut crop.

Heretofore utilized feeder assemblies are provided with conveyer chains, elevators, or some other type of conveyance means, and merely serve to transport the crop from the header housing up and into the threshing system where the kernels are threshed from the crop.

Often the crop being passed into the threshing assembly includes stalks which are stiff and rigid. This reduces the speed at which crops may be fed into the threshing system, as well as requiring additional forces within the threshing concave to loosen grain from the stalks. This results in slowing down the speed at which crops can be harvested. In other situations, wind and rain may have caused the crop to become twisted around one another and bent downwardly, sometimes to the ground. As this tangled mass of cut crop is passed through the feeder assembly and into the rotating concave, the crop often loads upon one side of the threshing rotor and is not equally distributed within the threshing assembly. Threshing efficiency and effectiveness is thereby reduced.

Where rotary type combines have a stationary concave, feeding the crop into the lower quadrant of the rotor is the simplest way to feed the rotor and cut crop distribution within the rotor is acceptable. However, with threshing assemblies which utilize a rotating concave, a more uniformly distributed positioning of the cut crop entering the concave produces more efficient and effective threshing.

Farming currently involves very low profit margin products, so a major incentive exists for farmers to optimize their production operations and to maintain them at maximum efficiency. Where the efficiency of the combine is reduced by a waste of labor, material and time in, for example, unclogging feeder housings, slowing the forward speed of the combine to prevent clogging, raising the sickle to reduce the volume of straw intake, etc. profits from the harvested crops is reduced.

The present invention is directed to overcome one or more of the problems as set forth above.

DISCLOSURE OF THE INVENTION

A grain combine has a header for receiving cut crops, means for moving the cut crops into and through a header discharge port and into a feederhouse for transporting the cut crops from the header into a rotating concave threshing system. The feederhouse has first and second laterally spaced apart endless conveyors adapted to be rotated in a common direction. A floor is spaced from the first and second endless conveyors and extends from the header discharge port to a location immediately adjacent an intake end of the rotating concave threshing system. The floor and endless conveyors define a cut crop passageway from the header discharge port to the intake end of the threshing system. A vertical dividing wall is positioned in the cut crop passageway, between the first and second endless conveyors and extends from the intake end of the concave, through the header discharge port, and into the header and define separate first and second discrete cut crop passageways from the header to the intake end of the threshing system.

BRIEF DESCRIPTION OF THE DRAWINGS

FIG. 1 is a simplified diagrammatic illustration of a combine with a portion broken away to show a crop feeding apparatus for a rotating concave threshing mechanism in accordance with the present invention;

FIG. 2 is a diagrammatic top cross-sectional view of the header, feederhouse, and rotating concave threshing mechanism of this invention;

FIG. 3 is a diagrammatic cross-sectional side view of the apparatus of FIG. 2 with the side walls of the feederhouse removed; and FIG. 4 is a diagrammatic cross-sectional view of the feederhouse and the conveyors within the feederhouse.

BEST MODE FOR CARRYING OUT THE INVENTION

Referring to FIGS. 1 and 2, a combine 10 of this invention has a header 12 for receiving cut crops which have been cut by a sickle 14. The cut crops (not shown) fall into header 12 and are transported by an auger 16, a portion of which is shown, or other means for moving the cut crops through a discharge port 18 into a crop feeding apparatus or feederhouse 20 in a conventional manner. The feederhouse 20 transports the cut crops from the header 12 into a rotating concave threshing system 24.

Such combines 10 having a rotating concave threshing system 24 are well known in the art. By the term concave threshing system 24, it is meant a birotor threshing assembly having a rotor 26 positioned within a concave 28 with cut crop passing from the feederhouse 20 into an annulus 30 between the rotor 26 and the concave 28. As best shown in FIG. 1, the rotor 26 and concave 28 are independently connected to a hydraulic motor 34 which is operatively connected to a hydraulic pump 36 driven by a power source 38. The rotor 26 and concave 28 are each rotatable in a preselect direction relative one to the other via the motor 34. For simplicity, a short hand method of describing cut crop passing into the annulus 30, will be described as the cut crop passing into the concave 28.

As best shown in FIGS. 2 and 3, the feederhouse 20 of this invention has first and second laterally spaced apart endless feeder conveyors 44,46 rotatably supported on first and second shafts 48,50. The conveyors 44,46 are adapted to be rotated in a common direction. Means 54 is provided for simultaneously rotating the conveyors 44,46. The means 54 including a pair of sprocket 56,58 operatively connected to each of the first and second shafts 48,50 and a pair of endless chains 60,62 encircle the sprockets. The second shaft 50 is driven by the power source 34 via a spur gear 64.

As best shown in FIGS. 3 and 4, a floor 68 is spaced from the first and second endless conveyors 44,46 and extends from the header discharge port 18 to a location immediately adjacent an intake end 70 of the concave 28 threshing system 24. The floor 68 and endless conveyors 44,46 define a cut crop passageway 72 from the header discharge port 18 to the intake end 70 of the concave 28. As set forth above, this cut crop passageway 72 is further defined by a pair of vertical side plates 74,76 which prevents cut crops from discharging over the side of the feeder conveyors 44,46.

A vertical dividing wall 80 is positioned in the cut crop passageway 72, between the first and second endless conveyors 44,46. The wall 80 extends from the intake end 70 of the concave 28, through the header discharge port 18, and through the header 12. The dividing wall 80 and associated floor 68, feeder conveyors 44,46 and side plates 74,76 define first and second discrete cut crop passageways 82,84 extending from immediately adjacent or beyond the sickle 14, through the header 12, to the intake end 70 of the concave 28.

The first and second cut crop passageways 82,84 each have a discharge end 86,88 and a longitudinally extending axis 90,92. The longitudinal axis 90,92 define a plane passing through both axis and being substantially equally space from the respective endless feeder conveyors 44,46 and the floor 68. In the preferred construction shown, the plane of the first and second passageways 82,84 intersect the intake end 70 of the rotatable concave 28 on opposed sides of an axis 94 of rotation of the concave 28.

In the preferred embodiment shown, the first and second cut crop passageways 82,84 open into the concave 28 at circumferentially spaced locations about 180 degrees apart. It is also preferred that the first and second cut crop passageways 82,84 are of substantially equal volume. By this preferred construction, cut crop is more uniformly distributed to the threshing system 24 and efficiency is maximized.

In order to further maximize efficiency of separation of cut crop into more uniform volumes, it is preferred that the dividing wall 28 extend through the header 12 to a location immediately adjacent or beyond the sickle 14.

INDUSTRIAL APPLICABILITY

The invention is for the purpose of maximizing the capacity of the combine 10. Capacity, means the amount of cut crop that can be put through the combine 10 with a minimum of grain loss. In the operation of the apparatus of this invention the crop cut by the sickle 14 is immediately separated into two substantially equal volumes by the dividing wall 80. These volumes remain separated one from the other as they pass from the header 12, through the feeder house 20 and into the concave threshing system 24.

By so separating the cut crop into substantially equal volumes, bunching and innertangeling of the cut crop is reduced which increases the distribution of cut crop into the concave 28. Such control of cut crop distribution upon entering the concave 28 and the fact that it then becomes possible to space the crop volumes about 180 degrees apart in the concave 28 markedly improves the capacity of threshing. The waste of time, labor and equipment to clean out slugs of cut crop is also reduced.

Other aspects, objects and advantages of the present invention can be obtained from a study of the drawings, the disclosure and the appended claims.

We claim:

1. In a grain combine having a header for receiving cut crops, a means for moving the cut crops into and through a header discharge port into a feederhouse for transporting the cut crops from the header into a rotating concave threshing system, the improvement comprising:

said feederhouse having first and second laterally spaced apart endless conveyors adapted to be rotated in a common direction;

a floor spaced from the first and second endless conveyors and extending from the header discharge port to a location immediately adjacent an intake end of the concave threshing system, said floor and endless conveyors defining a cut crop passageway from the header discharge port to the intake end of the concave; and a vertical dividing wall connected to the feederhouse and positioned in the cut crop passageway between the first and second endless conveyors and extending from the intake end of the concave through the header discharge port, defining separate first and second discrete cut crop passageways from the header to the intake end of the concave.

2. A grain combine, as set forth in claim 1, wherein the first and second cut crop passageways each have a discharge end and a longitudinally extending axis defining a plane passing through both axes and being substantially equally spaced from the respective endless conveyors and the floor, wherein said plane intersects the intake end of the rotatable concave on opposed sides of an axis of rotation of the concave.

3. In a grain combine, as set forth in claim 2, wherein the first and second passageways open into the concave at circumferentially spaced locations about 180 degrees apart.

4. In a grain combine, as set forth in claim 1, wherein the vertical dividing wall extends through the header to one of a location within the header immediately adjacent a sickle of the combine and a location spaced beyond the sickle.

5. In a grain combine, as set forth in claim 1, wherein the first and second passageways are of substantially equal volume.

6. In a grain combine having a header for receiving cut crops, said cut crop being moved into and through a header discharge port into a feederhouse for transporting the cut crops from the header into a rotating concave threshing system, the improvement comprising:

said feederhouse having first and second laterally spaced apart endless conveyors adapted to be rotated in a common direction;

a floor spaced from the first and second endless conveyors and extending from the header discharge port to a location immediately adjacent an intake end of the concave threshing system, said floor and endless conveyors defining a cut crop passageway from the header discharge port to the intake end of the concave; and a vertical dividing wall positioned in the cut crop passageway between the first and second endless conveyors thereby defining separate first and second discrete cut crop passageways from the header to the intake end of the concave.

* * * * *